(12) United States Patent
Wang et al.

(10) Patent No.: US 7,201,427 B2
(45) Date of Patent: Apr. 10, 2007

(54) SUN VISOR ASSEMBLY

(75) Inventors: Jianhua Wang, Canton, MI (US);
George F. Lambert, Fenton, MI (US);
Gregory J. Vargo, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/360,821

(22) Filed: Feb. 23, 2006

(65) Prior Publication Data

US 2006/0138799 A1 Jun. 29, 2006

Related U.S. Application Data

(62) Division of application No. 11/007,631, filed on Dec. 8, 2004, now Pat. No. 7,032,949.

(51) Int. Cl.
*B60R 1/12* (2006.01)
(52) U.S. Cl. .................... 296/97.5; 362/492
(58) Field of Classification Search .............. 296/97.1, 296/97.5; 362/492
See application file for complete search history.

(56) References Cited

U.S. PATENT DOCUMENTS 3,375,364 A * 3/1968 Marcus .................. 362/144
5,938,321 A * 8/1999 Bos et al. ................ 362/494
2005/0281041 A1* 12/2005 Kaphengst et al. ........ 362/492

* cited by examiner

*Primary Examiner*—Joseph D. Pape
(74) *Attorney, Agent, or Firm*—Laura C. Hargitt

(57) ABSTRACT

A sun visor assembly, wherein the sun visor thereof includes a vanity mirror and vanity lighting, wherein the functionally thereof is characterized by the sun visor being pivotal, rotatable and axially slidable relative to its mounting, wherein a slide mechanism supplies electrical power to the vanity lighting at all slide positions, and wherein power delivery is mechanically dependable and electrically reliable via an electrical slide component of the slide mechanism. Additionally the sun visor assembly according to the present invention optionally includes selectively illuminable, integrated reading lights at a bottom periphery thereof.

2 Claims, 5 Drawing Sheets

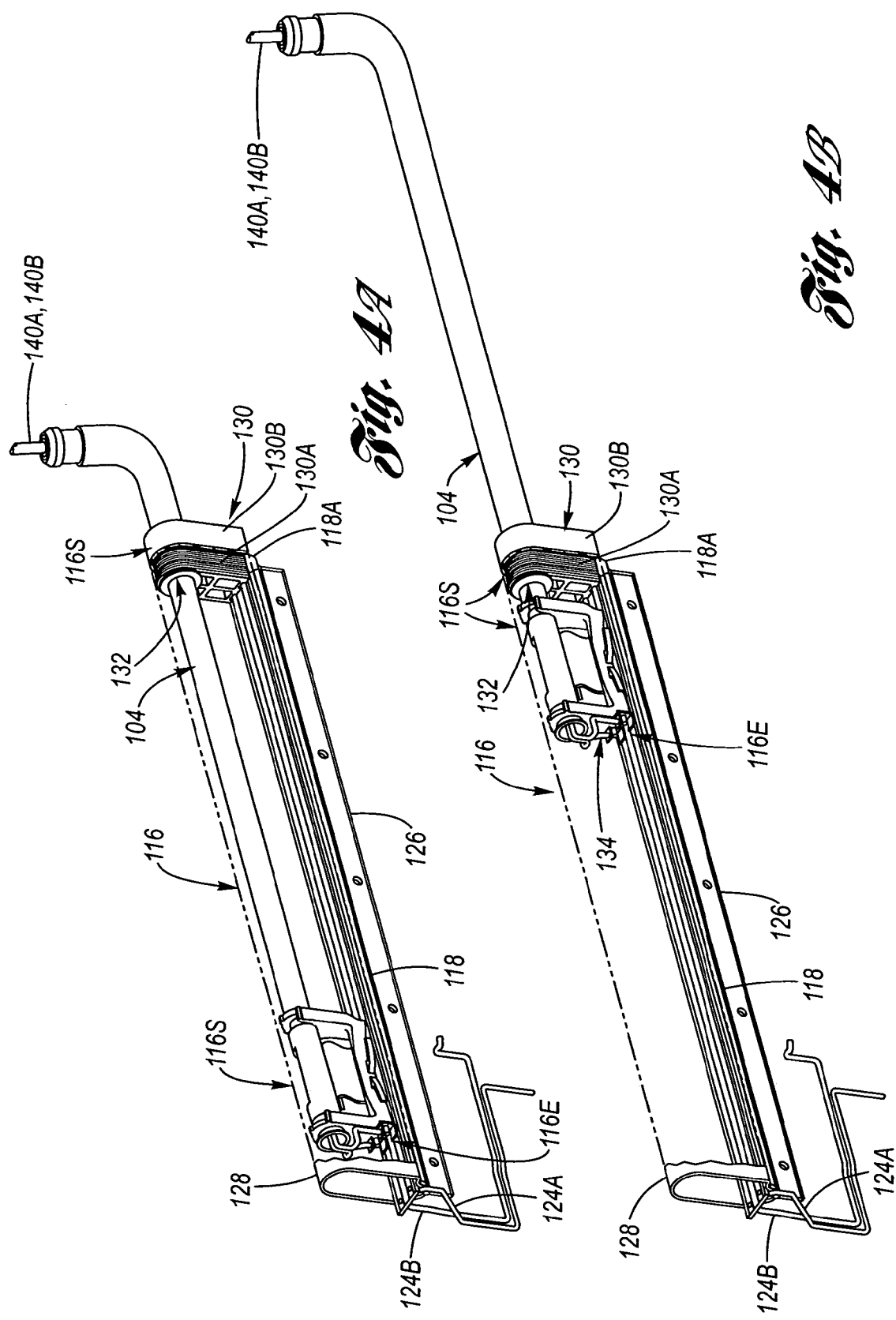

SUN VISOR ASSEMBLY

RELATED APPLICATION

This application is a division of U.S. Ser. No. 11/007,631 filed on Dec. 8, 2004 now U.S. Pat. No. 7,032,949.

TECHNICAL FIELD

The present invention relates to automotive sun visors interfaced slidably, pivotally and rotatably relative to a mounting located generally adjacent the windshield of a motor vehicle. More particularly, the present invention relates to a sun visor having a slide mechanism for slidably guiding the sun visor relative to the pivot rod and for delivering electrical power to components of the sun visor at any axially slid position of the sun visor. Further, the present invention relates to a sun visor incorporating integrated circuits and LED lighting located at the inner side panel thereof. Still further the present invention relates to a sun visor having integrated reading lights located at a periphery thereof.

BACKGROUND OF THE INVENTION

Drivers and passengers of motor vehicles are from time to time subjected to undesirable lighting situations originating from outside the motor vehicle. For example, the sun may be low on the horizon and be shining brightly through the windshield, or the sun may be bothersome as it shines through a side window. For these and other situations of the sort, sun visors are provided adjacent the windshield to assist alleviation of illumination discomfort.

As can be understood from FIG. 1, a prior art sun visor 10 is pivotally mounted to a pivot rod 12, which includes a ninety degree elbow 14, which is rotatably mounted to a structural component of the motor vehicle via a mounting cap 18 which is fastened thereto, as for example by screws. By way of example, the elbow 14 is rotatably attached to the mounting cap 18 in a spring loaded manner via a compression spring, wherein the spring provides frictional resistance as the elbow is rotated with respect to the mounting cap. Typically, a sun visor is mounted, as generally described, at each of the left and right sides of the windshield 24 (only the driver-side sun visor being shown for simplification).

As can be further seen at FIG. 1, the pivot rod enables an occupant of the front seat to pivot the sun visor 10 to a storage location A adjacent the headliner 28 to a deployed location B so as to selectively occlude the windshield 24 by pivoting on the pivot rod 12 (along arrows P), which pivoting may well exceed ninety degrees. Further, the rotation afforded the elbow 14 allows the pivot rod 12 with its associated sun visor 10 to be rotated from a location adjacent the windshield 24 to an auxiliary location C adjacent the adjoining side door window 26 via a rotation of the elbow (along arrows R), a rotation which may exceed ninety degrees. A further exemplar description of a prior art sun visor is contained in U.S. Pat. No. 6,796,593 to Hennessey.

Increasing emphasis on the aesthetics and utility of sun visors has transpired. Today, a sun visor is expected to be a complement to, and blend handsomely with, the interior appointments of the motor vehicle. Additionally, a sun visor is expected to be both versatile and functional beyond those enumerated with respect to FIG. 1.

For example, U.S. Pat. No. 4,886,579 to Miller et al describes a snap-in vanity mirror located at an inner side panel of the sun visor; U.S. Pat. No. 5,331,518 to Roark et al describes a sun visor having a vanity mirror and a pair of vanity lamps, one at either side of the vanity mirror; U.S. Pat. No. 4,925,233 to Clark describes a sun visor assembly structured so that the sun visor is axially slidable on the pivot rod; and finally, U.S. Pat. No. 5,533,776 to Agro et al and U.S. Pat. No. 5,653,490 to Fink et al describe sun visors provided with a vanity mirror and vanity lighting, wherein the sun visor is axially slidable on the pivot rod, wherein the former provides an electrical connection via detent contacts at the retracted position (power not being available during sliding), and the latter provides electrical power via coiling of wiring (which over time can fail due to stresses of wire flexing).

What remains needed in the art is a full feature sun visor assembly in which the sun visor has a vanity mirror and vanity lighting, wherein the sun visor is pivotal, rotatable and axially slidable relative to its mounting, and wherein the siding feature supplies electrical power to the vanity lighting at all slide positions, and wherein power delivery is mechanically dependable and electrically reliable.

What additionally, remains needed in the art is a full feature sun visor which further includes integrated reading lights.

SUMMARY OF THE INVENTION

The present invention is a full feature sun visor assembly, wherein the sun visor thereof includes a vanity mirror and vanity lighting, wherein the functionality thereof is characterized by the sun visor being pivotal, rotatable and axially slidable relative to its mounting, wherein the siding feature supplies electrical power to the vanity lighting at all slide positions, and wherein power delivery is mechanically dependable and electrically reliable. Additionally, the sun visor assembly according to the present invention optionally includes integrated reading lights.

The sun visor assembly according to the present invention includes a sun visor, a pivot rod and a slide mechanism interfaced with the sun visor and the pivot rod for providing relative pivoting and axial sliding, and further for providing electrical power to electrical components of the sun visor at any and all pivoting and sliding positions of the sun visor relative to the pivot rod.

The slide mechanism includes a sun visor slide component and an electrical slide component. A planar base is provided with a pair of electrical tracks. A first end cap is located at one end of the base, wherein the first end cap has a first pivot rod receptacle. A carrier tube is connected to the base and the first end cap. A carrier is pivotally connected with the pivot rod in non-slidable relation therewith, and is slidably interfaced with the base and in guiding relation with the carrier tube, having a second pivot rod receptacle, a detent spring interfaced with the pivot rod, and a pair of electrical contacts slidably interfaced with the pair of electrical tracks. First and second main electrical leads, interconnected with a power source of the motor vehicle, pass through the pivot rod and connect with the first and second electrical contacts, respectively. As the sun visor is slid axially relative to the pivot rod, a respective electrical contact slides upon, and with good electrical contact with respect to, its respective electrical track.

The slide mechanism is interconnected with an interior frame assembly of the sun visor, and inner and outer side panels are fitted over the interior frame assembly. The inner side panel has a vanity mirror and sources of vanity illumination. Electrically, the sources of vanity illumination are preferably light emitting diodes (LEDs) and an electrical circuit within the sun visor includes electrical components (i.e., a circuit board) for powering the LEDs. Preferably, a pivotal vanity mirror cover is provided over the vanity mirror, wherein preferably pivoting of the vanity mirror cover actuates the sources of vanity illumination.

In a preferred alternative embodiment, a source of reading light is located at the bottom periphery of the sun visor, most preferably two spaced apart reading lights being provided. A user actuated switch is further provided at the sun visor bottom periphery for selectively actuating illumination of the source of reading light.

Accordingly, it is an object of the present invention to provide a full feature sun visor assembly, wherein the sun visor thereof includes a vanity mirror and vanity lighting, wherein the functionally thereof is characterized by the sun visor being pivotal, rotatable and axially slidable relative to its mounting, wherein the siding feature supplies electrical power to the vanity lighting at all slide positions, and wherein power delivery is mechanically dependable and electrically reliable, and further optionally providing the sun visor assembly with an integrated source of reading light.

This and additional objects, features and advantages of the present invention will become clearer from the following specification of a preferred embodiment.

BRIEF DESCRIPTION OF THE DRAWINGS

FIG. 4A is a perspective view of a slide mechanism of sun visor assembly according to the present invention, shown at the slidably retracted position of FIG. 3A.

FIG. 4B is a perspective view of the slide mechanism of the sun visor assembly according to the present invention, shown at the slidably deployed position of FIG. 3B.

DESCRIPTION OF THE PREFERRED EMBODIMENT

Figure 6A:
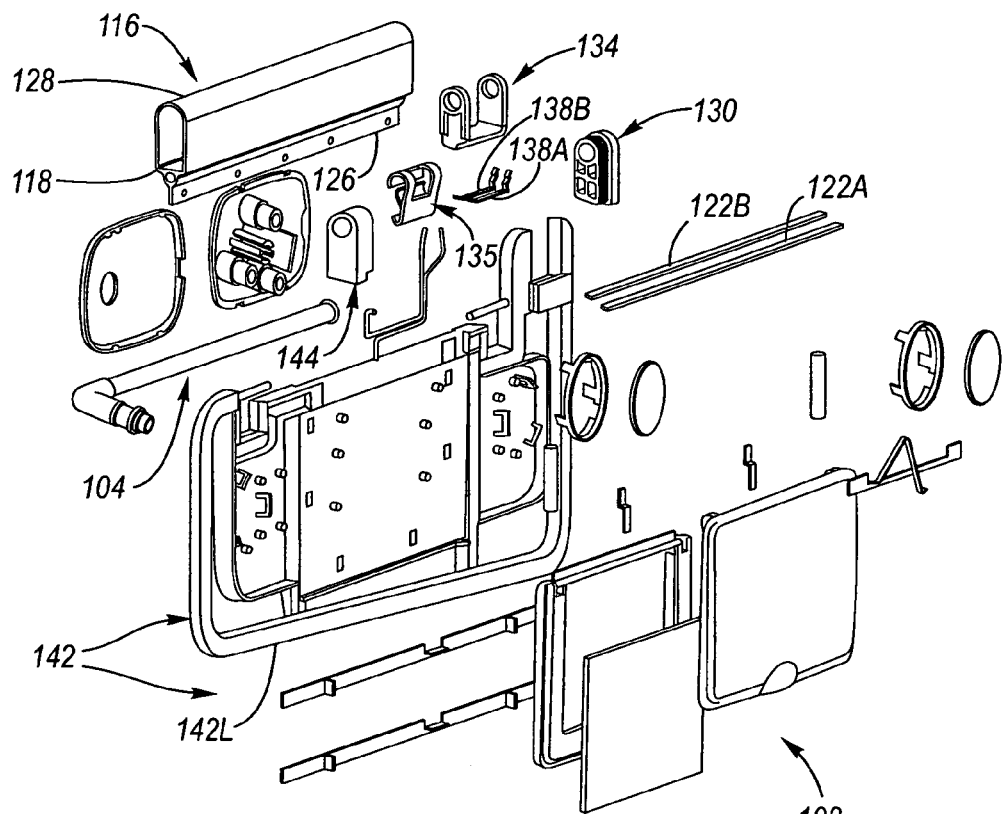
FIG. 6A is an exploded, perspective view of an interior frame assembly of the sun visor according to the present invention.
Figure 6B:
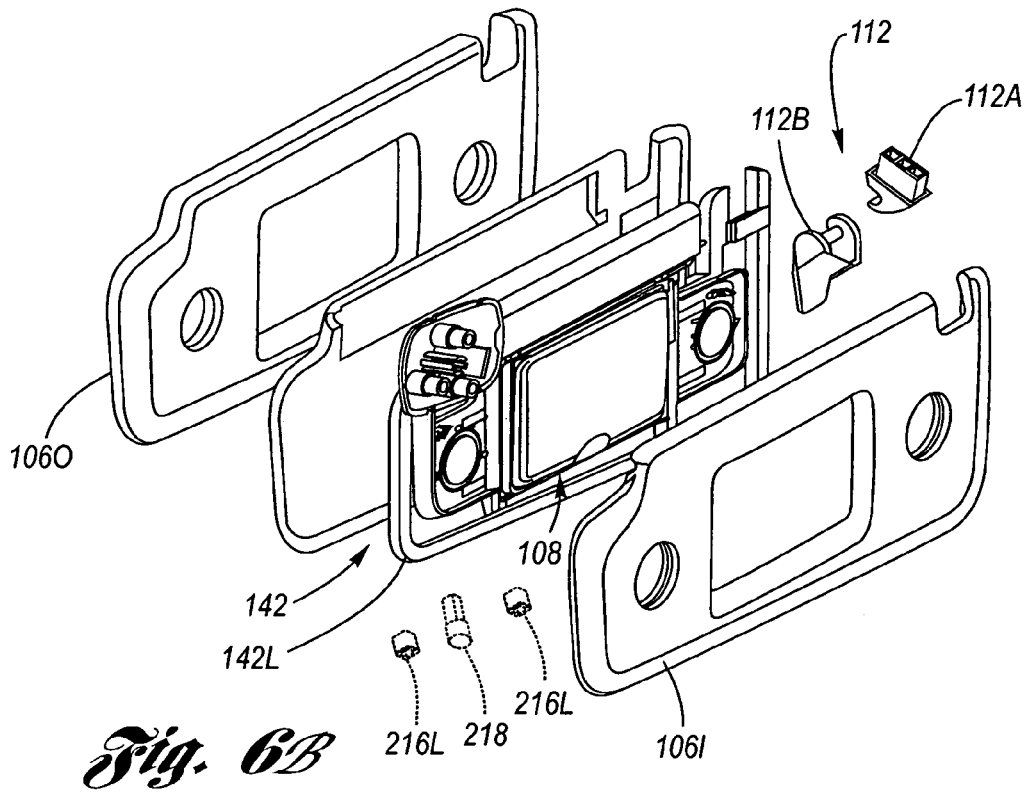
FIG. 6B is an exploded, perspective view of inner and outer side panels with respect to an interior frame assembly of the sun visor according to the present invention.
Figure 7:
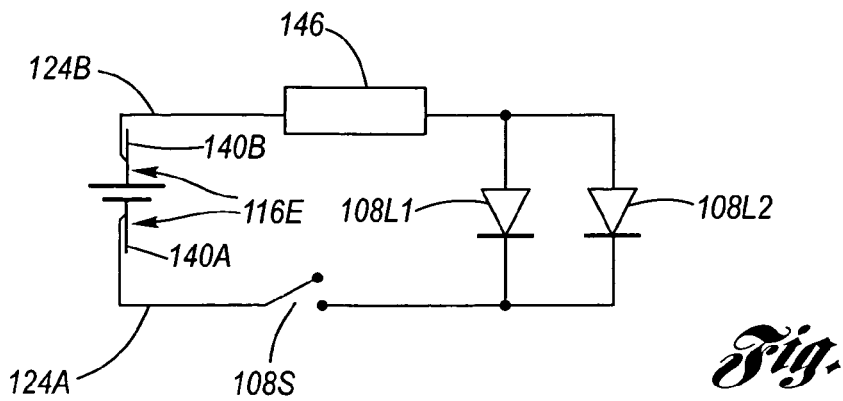
FIG. 7 is an example of a circuit for the sun visor assembly according to the present invention.
Figure 8:
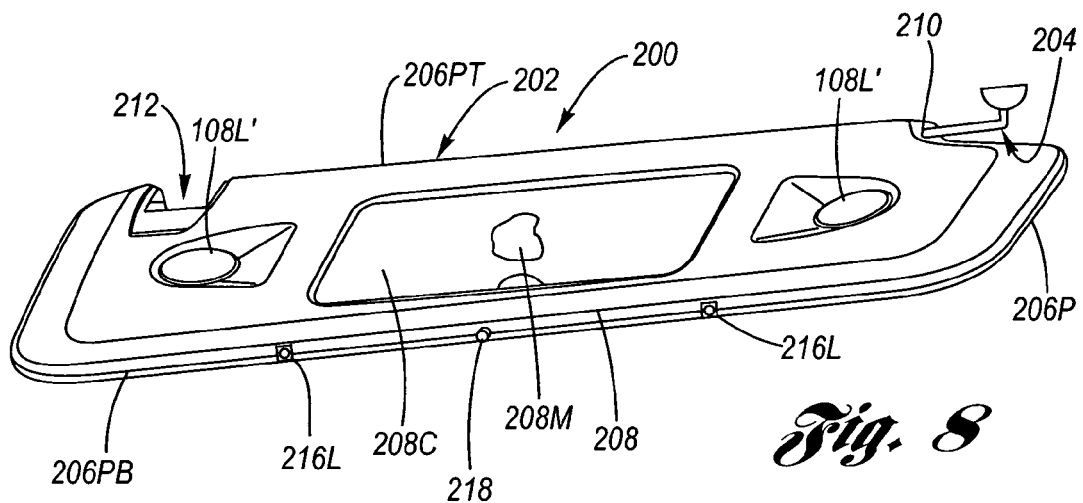
FIG. 8 is a perspective view of an alternative sun visor assembly according to the present invention, wherein selectively illuminable source of reading light is provided at a bottom periphery thereof.
Figure 8A:
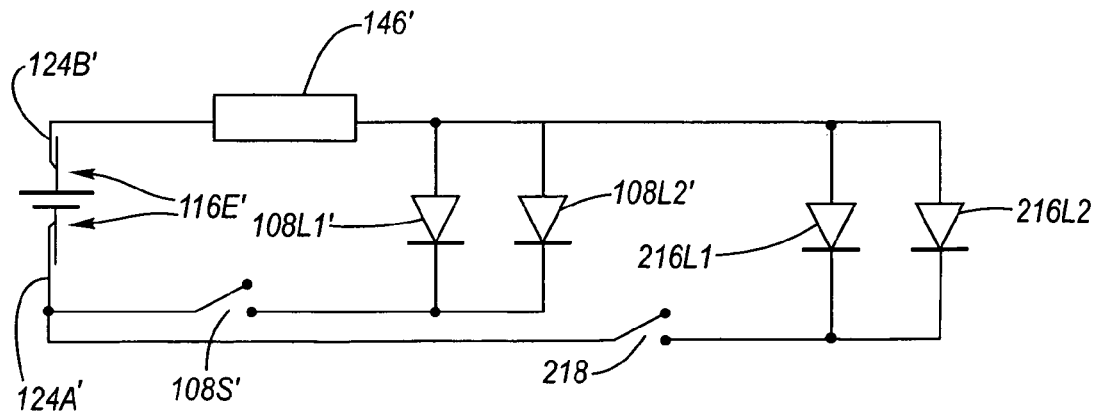
FIG. 8A is an example of an electrical circuit for the sun visor assembly including the selectively illuminable source of reading light of FIG. 8.

Referring now to the Drawing, FIGS. 2 through 7 depict an example of a sun visor assembly 100 according to the present invention having an integrated slide mechanism, and FIGS. 8 and 8A depict an alternative embodiment of a sun visor assembly 200 having selectively illuminable, integrated source of reading light.

Figure 2:
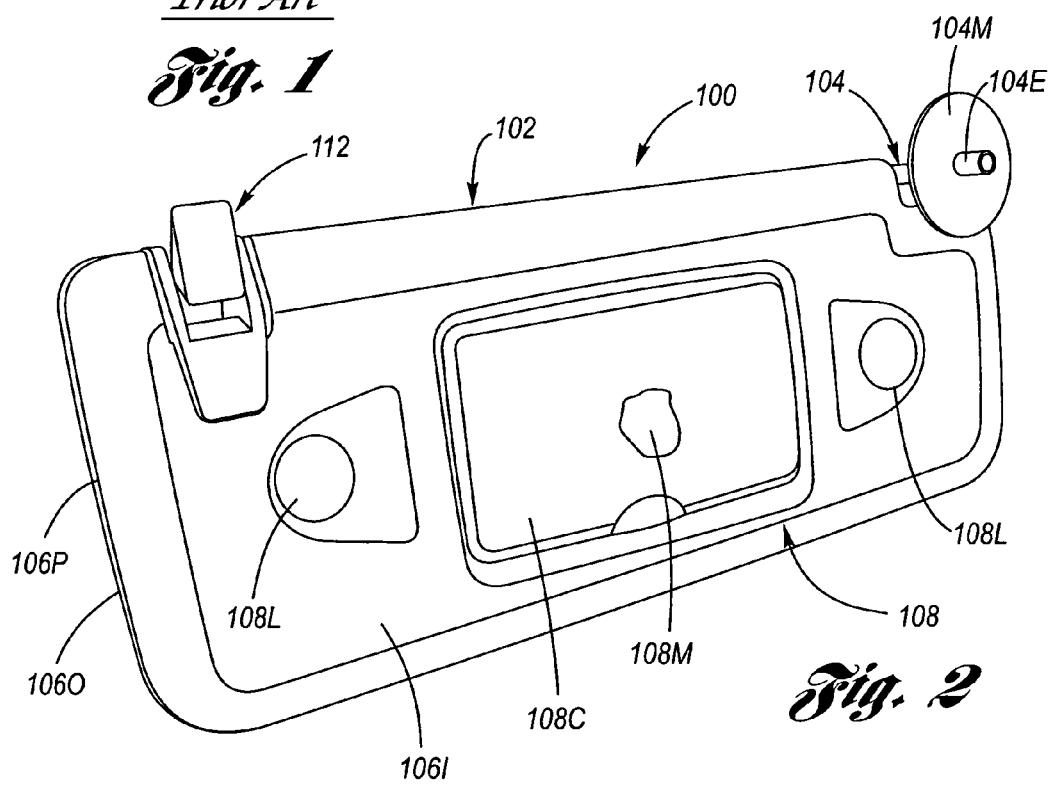
FIG. 2 is a perspective view of the sun visor assembly according to the present invention, wherein an inner side panel thereof is shown.

FIG. 2 depicts, by way of preferred exemplification only, a the sun visor assembly 100, which includes a sun visor 102 and a pivot rod 104. The sun visor 102 has a generally elongated rectangular shape, characterized by an inner side panel 106I, an oppositely disposed outer side panel 106O, and a side panel periphery 106P bisecting the sun visor with respect to the inner and outer side panels. A vanity mirror assembly 108 is located at the inner side panel 106I, which includes a vanity mirror 108M, a pivotally mounted vanity mirror cover 108C which is selectively flipped from a closed position which occludes the vanity mirror to an open position which exposes the vanity mirror, and a source of vanity illumination 108L, preferably in the form of a vanity light located at each side of the vanity mirror (which may or may not be coverable by the vanity mirror cover). Preferably a switch 108S is incorporated in the sun visor and interfaced with the vanity mirror cover, in a manner known in the art, such that when flipped to the open position, the vanity illumination is lighted.

Figure 3A:
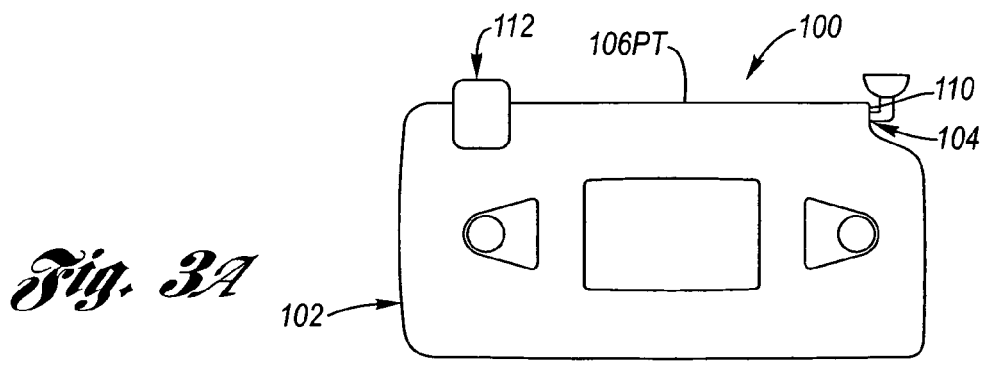
FIG. 3A is a side view of the sun visor assembly according to the present invention, shown at a slidably retracted position thereof.
Figure 3B:
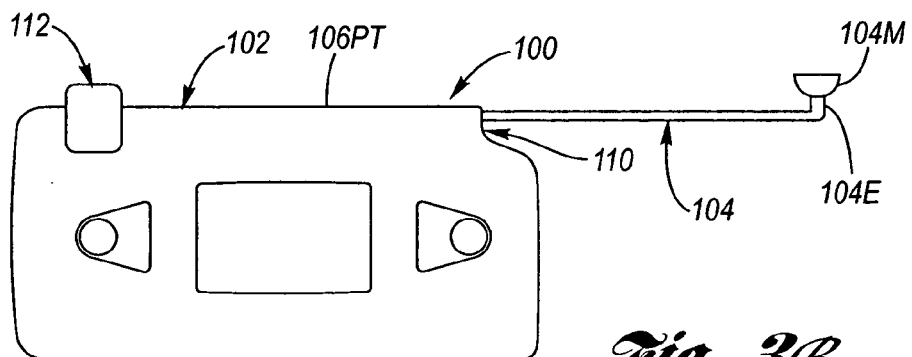
FIG. 3B is a side view of the sun visor assembly according to the present invention, shown at a slidably deployed position thereof.
Figure 5:
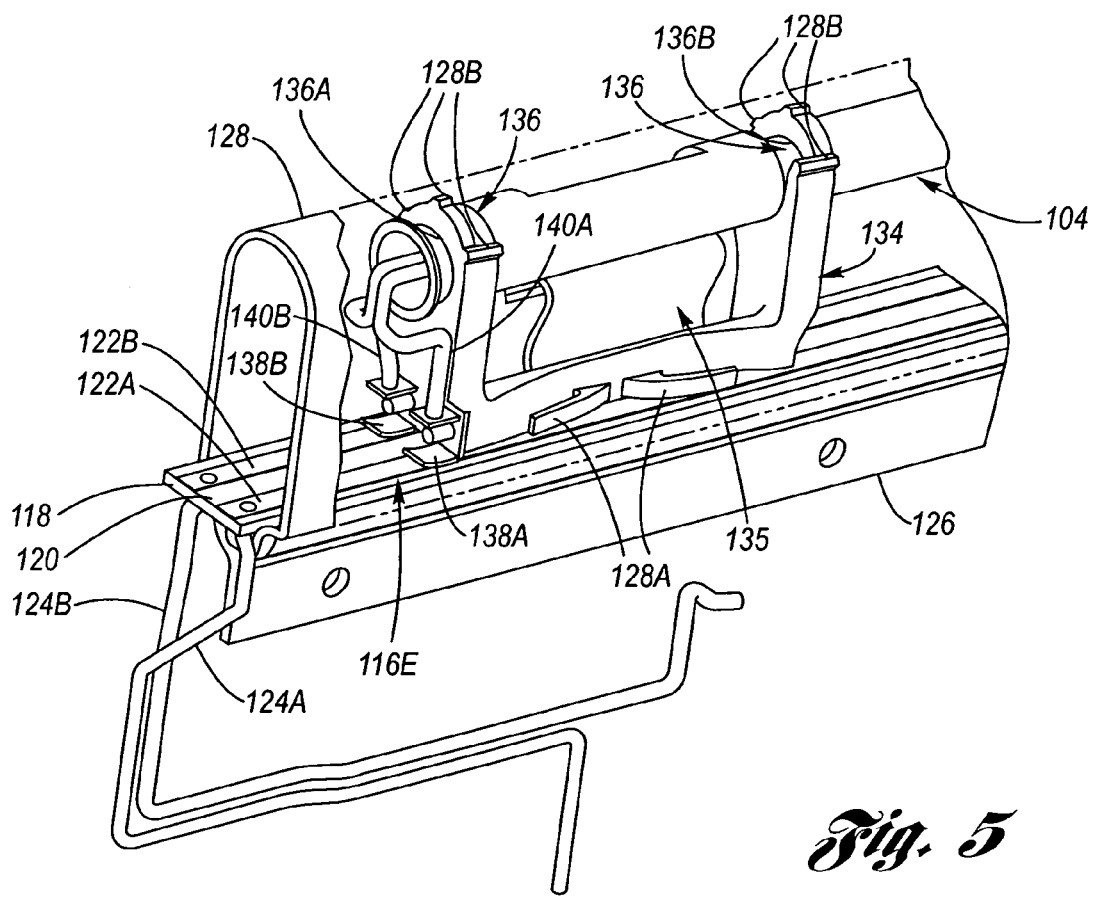
FIG. 5 is a detail, partly broken away, perspective view of the slide mechanism according to the sun visor assembly of the present invention.

Now additionally referring to FIGS. 3A and 3B, it will be further noted that the pivot rod 104 enters at a pivot rod entry 110 into, and is disposed adjacent, a top periphery 106PT of the side panel periphery 106P of the sun visor 102. Additionally, it will be noted the pivot rod 104 includes an elbow 104E and a mounting 104M for connecting to a structural component of a motor vehicle so that the pivot rod is rotatable about the elbow. A recessed clip feature 112 is provided at the top periphery 106PT, in distally spaced relation to the pivot rod entry 110, for being clippably interfaced with a mating clip structure of the motor vehicle (not shown, but of a type well known in the art), whereby the sun visor is pivotal on the pivot rod, yet selectively supported thereat.

The sun visor assembly 100 provides axial sliding of the sun visor 102 with respect to the pivot rod 104. As shown at FIG. 3A, at a slidably retracted position, the pivot rod 104 is substantially entirely received within sun visor 102. At this position, the clip feature 112 (shown best at FIG. 2, and schematically at FIGS. 3A and 3B) is located for selective clipping to the aforementioned mating clip structure of the motor vehicle. As shown at FIG. 3B, the sun visor has been slid axially along the pivot rod 104 to a slidably deployed position, wherein prior to sliding, the clip feature 112 would have been unclipped from the aforementioned mating clip structure of the motor vehicle.

An important aspect of the sun visor assembly 100 according to the present invention is that at any axially slid position of the sun visor 102, electrical power is provided to electrical components of the sun visor, via a reliable and dependable slide mechanism 116, which will now be detailed, with additional reference being directed to FIGS. 4A through 6B.

The slide mechanism 116 includes a sun visor slide component 116S and an electrical slide component 116E. A planar base 118 has an elongated flat base face 120. First and second electrical tracks 122A, 122B run the length of the base face 120, each being electrically isolated from the other. A first secondary electrical lead 124A is electrically connected with the first electrical track 122A, and a second secondary electrical lead 124B is electrically connected with the second electrical track 122B, wherein the first and second electrical leads are electrically connected to electrical components of the sun visor 102. A frame connection spar 126 is connected with the base 118 opposite the base face 120. A generally U-shaped carrier tube 128 is connected to the base 118, which is disposed over the base face 120 and runs the length thereof.

The slide mechanism 116 additionally includes a first end cap 130 which is connected to a first end 118A of the base 118. The first end cap 130 is preferably of dual construction, having first and second first end cap components 130A, 130B, the first end cap component being of reduced dimension for receiving the carrier tube 128. A first pivot rod receptacle 132 is formed in the first end cap 130, wherein the pivot rod 104 passes slidably and pivotally therethrough in guidable relation thereto.

Figure 1:
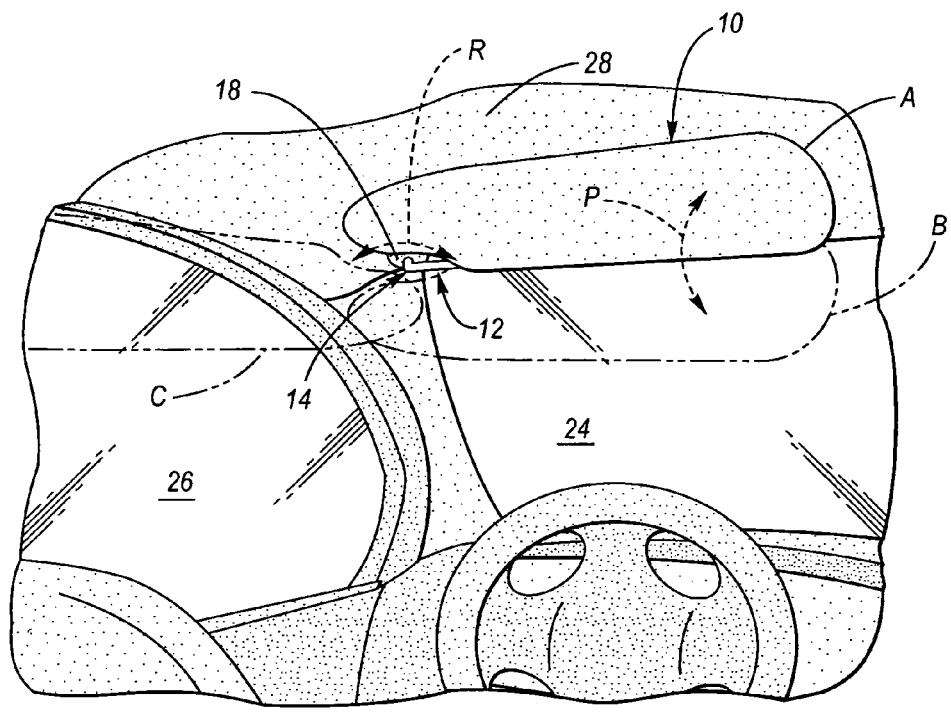
FIG. 1 is a perspective view of a prior art sun visor assembly, shown operatively with respect to a motor vehicle.

The slide mechanism 116 further includes a carrier 134 slidably interfaced with the base 118 and guidably interfaced in slidable relation to the carrier tube 128. The carrier 134 has a second pivot rod receptacle 136, preferably in the form of a pair of mutually spaced apart second pivot rod receptacles 136A, 136B, wherein the pivot rod 104 passes therethrough in non-slidable, pivotal relation thereto. For slidably abutting the carrier tube 128, there is provided on either side of the carrier 134 resilient guidance abutments 128A, and additional guidance abutments 128B adjacent the rod receptacles 136. The carrier 134 further has a detent spring 135 interfaced with the pivot rod 104 for detently defining a pivot up position of the sun visor with respect to a headliner (not shown, but understandable from FIG. 1) of the motor vehicle. First and second electrical contacts 138A, 138B are slidably interfaced with the first and second electrical tracks 122A, 122B so that electrical connection is provided respectively therebetween. In this regard, as the sun visor 102 is slid axially relative to the pivot rod 104, the first electrical contact 138A slides upon, and with good electrical contact with respect to, the first electrical track 122A, and the second electrical contact 138B slides upon, and with good electrical contact with respect to, the second electrical track 122B. First and second main electrical leads, 140A, 140B, which are interconnected with a power source of the motor vehicle, pass through the pivot rod and connect with the first and second electrical contacts 138A, 138B, respectively.

Referring now to FIGS. 6A and 6B, it will be seen that the slide mechanism 116 is interconnected, via the spar 126, to an interior frame assembly 142 of the sun visor 102. Additionally, it will be seen that the inner and outer side panels 106I, 106O are fitted over, and interconnected with, the interior frame assembly. It will further be seen that a second end cap 144 is provided for connecting to the base 118 opposite the first end cap, whereat is the clip feature 112, composed of a center support 112A and a ticket holder 112B.

Referring to FIG. 7, electrically, it is preferred for the sources of vanity illumination 118L to be in the form of a pair of bezel covered light emitting diodes (LEDs) 118L1, 118L2 and an electrical circuit for powering the LEDs is connected with the first and second secondary electrical leads 124A, 124B within the sun visor, and includes electrical components (ie., a circuit board) 146 for powering the LEDs. As mentioned, preferably the pivotal vanity mirror cover 108C is interfaced with an electrical switch 108S in a manner known in the art so that pivoting of the mirror cover to its flipped open position actuates the sources of vanity illumination.

In operation, a user may pivot the sun visor on the pivot rod, or rotate the sun visor on the pivot rod elbow, and always power is supplied to the source of vanity illumination, and wherein the detent spring of the carrier provides a detent retained up position of the sun visor adjacent the headliner of the motor vehicle. Further, a user may axially slide the sun visor on the pivot rod, the guidance provided by the first and second pivot rod receptacles in conjunction with the guidance provided by the sliding interface of the carrier with respect to the carrier tube. Additionally, power is provided at all sliding positions of the sun visor to the sources of vanity illumination by the first and second electrical contacts with respect to the first and second electrical tracks (which collectively constitute the electrical slide component 116E).

In order to ensure long-term good electrical connections at the electrical slide component 116E, the first and second electrical tracks 122A, 122B and the first and second electrical contacts 138A, 138B are preferably composed of brass with gold coating, wherein the gold coating prevents formation of oxidation.

Referring now to FIGS. 8 and 8A, an alternative embodiment of sun visor assembly 200 is depicted. In this regard, it is preferred, but not mandatory, for the hereinabove described structure of the sun visor assembly 100 to be utilized.

The sun visor assembly 200 includes a sun visor 202 and a pivot rod 204. The sun visor 202 has a generally elongated rectangular shape, characterized by an inner side panel 206I, an oppositely disposed outer side panel 206O, and a side panel periphery 206P bisecting the sun visor with respect to the inner and outer side panels. A vanity mirror assembly 208 may be included, and if so, is located at the inner side panel 206I, and includes a vanity mirror 208M, preferably a pivotally mounted vanity mirror cover 208C which is selectively flipped from a closed position which occludes the vanity mirror to an open position which exposed the vanity mirror, and a source of vanity illumination 108L', preferably in the form of a pair of LED vanity lights 108L1', 108L2' (see FIG. 8A) preferably being the same as described hereinabove with respect to the sun visor assembly 100, one vanity light being located at each side of the vanity mirror (and may or may not be coverable by the vanity mirror cover). A switch 108S' (see FIG. 8A) is preferably incorporated in the sun visor 202 and interfaced with the vanity mirror cover in a manner known in the art such that when flipped to the open position, the vanity illumination is lighted.

The pivot rod 204 enters at a pivot rod entry 210 into, and is disposed adjacent, a top periphery 206PT of the side panel periphery 206P of the sun visor 202. Additionally, it will be noted the pivot rod 204 includes an elbow and mounting (not shown, but as above described with respect to the sun visor assembly 100) for connecting to a structural component of a motor vehicle so that the pivot rod is rotatable about the elbow. Preferably, a recessed clip feature 212 is provided at the top periphery 206PT, in distally spaced relation to the pivot rod entry 210, for being clippably interfaced with a mating clip structure of the motor vehicle (not shown, but of a type well known in the art), whereby the sun visor is pivotal on the pivot rod, yet selectively supported thereat.

At a bottom periphery 206PB of the side panel periphery 206P, a source of reading light 216L is provided, preferably in the form of two mutually spaced apart reading lights, each of which most preferably being an LED 216L1, 216L2 (see FIG. 8A). A micro-switch 218 is also provided at the bottom periphery 206PB for a user to selectively actuate the source of reading lights. Alternatively, no such switch may be present, as the switch may be located elsewhere in the motor vehicle, and the source of reading lights may also be interconnected with a door entry/exit illumination system. In any case, the source of reading light and the micro-switch (if provided) are connected to an interior frame assembly of the sun visor 202 (as, for example, referring to FIGS. 6A and 6B, the connection would be at the lower frame strut 142L, wherein the source of reading light 216L and the micro-switch 218 are shown in phantom in FIG. 6B), and protrude for user actuation by pressing thereupon at the bottom periphery 206PB, as shown at FIG. 8.

As shown at FIG. 8A, electrical power from the motor vehicle is delivered to the source of reading light 216L, as for example, via the electrical description hereinabove detailed with respect to the sun visor assembly 100. In this regard, the LED vanity lights 108L1', 108L2' and the LED reading lights 216L1, 216L2 are powered via electrical components (i.e., a circuit board) 146', wherein the LED vanity lights are selectively illuminable by the switch 208S, and, independently, the LED reading lights are selectively illuminable by the micro-switch 218, all of which being connected, by way of preferred example, with the first and second secondary electrical leads 124A', 124B' of an electrical slide component 116E' preferably the same as those described hereinabove with respect to the sun visor assembly 100.

In operation, a user selectively actuates the source of reading light 216, and then pivots the sun visor 202 so that the light is directed exactly where it is wanted, as for example upon a map being read.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A sun visor assembly for a motor vehicle having a headliner and a windshield, comprising:
   a sun visor having a periphery, said periphery having a top periphery and an opposite bottom periphery;
   a pivot rod connected to said sun visor substantially adjacent said top periphery, said pivot rod being oriented in parallel relation to said top periphery, wherein said sun visor is pivotal about said pivot rod between a deployed location whereat the sun visor selectively occludes the windshield and a storage location whereat the sun visor is adjacent the headliner; and
   a source of reading light located at said bottom periphery of said sun visor, wherein said source of reading light comprises at least one reading light which provides only generally focused light which is absent a broad pattern of illumination;
   wherein said source of reading light comprises:
      a pair of mutually spaced apart reading lights; and
      a micro-switch located between said pair of reading lights, wherein said micro-switch is selectively operable to regulate illumination of said pair of reading lights;
      wherein the reading lights are pointed in a direction parallel to a plane defined by said top and bottom peripheries and directly away from said top periphery.

2. The sun visor of claim 1, wherein said pair of reading lights comprise light emitting diodes.

* * * * *